US012570234B2

(12) United States Patent
Pezeshkfar et al.

(10) Patent No.: US 12,570,234 B2
(45) Date of Patent: Mar. 10, 2026

(54) VEHICLE RESTRAINT SYSTEMS

(71) Applicant: Supernal, LLC, Washington, DC (US)

(72) Inventors: Omid Pezeshkfar, Laguna Niguel, CA (US); Alexander Pozzi, Carlsbad, CA (US)

(73) Assignee: SUPERNAL, LLC, Irvine, CA (US)

( * ) Notice: Subject to any disclaimer, the term of this patent is extended or adjusted under 35 U.S.C. 154(b) by 0 days.

(21) Appl. No.: 18/422,980

(22) Filed: Jan. 25, 2024

(65) Prior Publication Data

US 2024/0253593 A1 Aug. 1, 2024

Related U.S. Application Data

(60) Provisional application No. 63/441,500, filed on Jan. 27, 2023.

(51) Int. Cl.
B60R 22/48 (2006.01)
B64D 11/06 (2006.01)

(52) U.S. Cl.
CPC ............ B60R 22/48 (2013.01); B64D 11/062 (2014.12); B60R 2022/4816 (2013.01)

(58) Field of Classification Search
CPC ......... B60R 22/00; B60R 22/34; B60R 22/48; A44B 11/20; A44B 11/2523; A44B 11/2534; A44B 11/2542; A44B 11/2549; Y10T 24/45; Y10T 24/45246; Y10T 24/45618; Y10T 24/45623
See application file for complete search history.

(56) References Cited

U.S. PATENT DOCUMENTS

| | | | | |
|---|---|---|---|---|
| 5,086,548 A | * | 2/1992 | Tanaka .............. | A44B 11/2549 |
| | | | | 24/579.11 |
| 11,825,917 B1 | * | 11/2023 | Wu ......................... | A44B 11/20 |
| 2004/0119599 A1 | * | 6/2004 | Stevenson ............... | B60R 22/48 |
| | | | | 340/686.1 |
| 2019/0061683 A1 | * | 2/2019 | Jessup ..................... | B60R 22/26 |
| 2019/0197326 A1 | * | 6/2019 | Ohno ..................... | B60R 22/12 |
| 2022/0063554 A1 | * | 3/2022 | Thomas ................. | B60R 22/34 |

* cited by examiner

*Primary Examiner* — Van T Trieu
(74) *Attorney, Agent, or Firm* — McDonnell Boehnen Hulbert & Berghoff LLP

(57) ABSTRACT

A vehicle includes a restraint system, one or more sensors, one or more light sources, and a computing device. The restraint system comprises one or more belt tongues, a buckle configured to latch to the one or more belt tongues, and one or more straps each attached to the buckle or at least one of the one or more belt tongues. The computing device is configured to receive, from the one or more sensors, image data while the one or more light sources are illuminating the restraint system. The computing device is also configured to determine, based on the image data, a position for each of the straps. The computing device is additionally configured to verify whether the position of each of the straps is in a respective predetermined location and output an indication of whether each of the straps are in the respective predetermined location.

19 Claims, 7 Drawing Sheets

PROCESSOR 504

SENSOR(S) 506

MEMORY 508

NETWORK COMMUNICATIONS MODULE 510

502

500

600

TRANSMITTING, BY ONE OR MORE RECEIVERS, ONE OR MORE SIGNALS TO EACH OF ONE OR MORE RFID TAGS IN A VEHICLE, WHERE THE VEHICLE COMPRISES A RESTRAINT SYSTEM AND ONE OR MORE RECEIVERS, WHERE THE RESTRAINT SYSTEM COMPRISES ONE OR MORE BELT TONGUES, ONE OR MORE BUCKLES CONFIGURED TO LATCH TO THE ONE OR MORE BELT TONGUES, ONE OR MORE RADIO-FREQUENCY IDENTIFICATION (RFID) TAGS, AND ONE OR MORE BELT BUCKLE SENSORS, WHERE EACH BELT BUCKLE SENSOR IS ASSOCIATED WITH A BELT TONGUE OF THE ONE OR MORE BELT TONGUES AND A BUCKLE OF THE ONE OR MORE BUCKLES, WHERE EACH BUCKLE SENSOR DETECTS WHETHER A RESPECTIVE BELT TONGUE OF THE ONE OR MORE BELT TONGUES IS LATCHED TO THE RESPECTIVE BUCKLE

602

IN RESPONSE TO TRANSMITTING THE ONE OR MORE SIGNALS, RECEIVING, BY THE ONE OR MORE RECEIVERS, AT LEAST ONE SIGNAL FROM AT LEAST ONE OF THE ONE OR MORE RFID TAGS, THE AT LEAST ONE SIGNAL INDICATING THAT AT LEAST ONE RESPECTIVE BELT TONGUE IS LATCHED TO THE RESPECTIVE BUCKLE

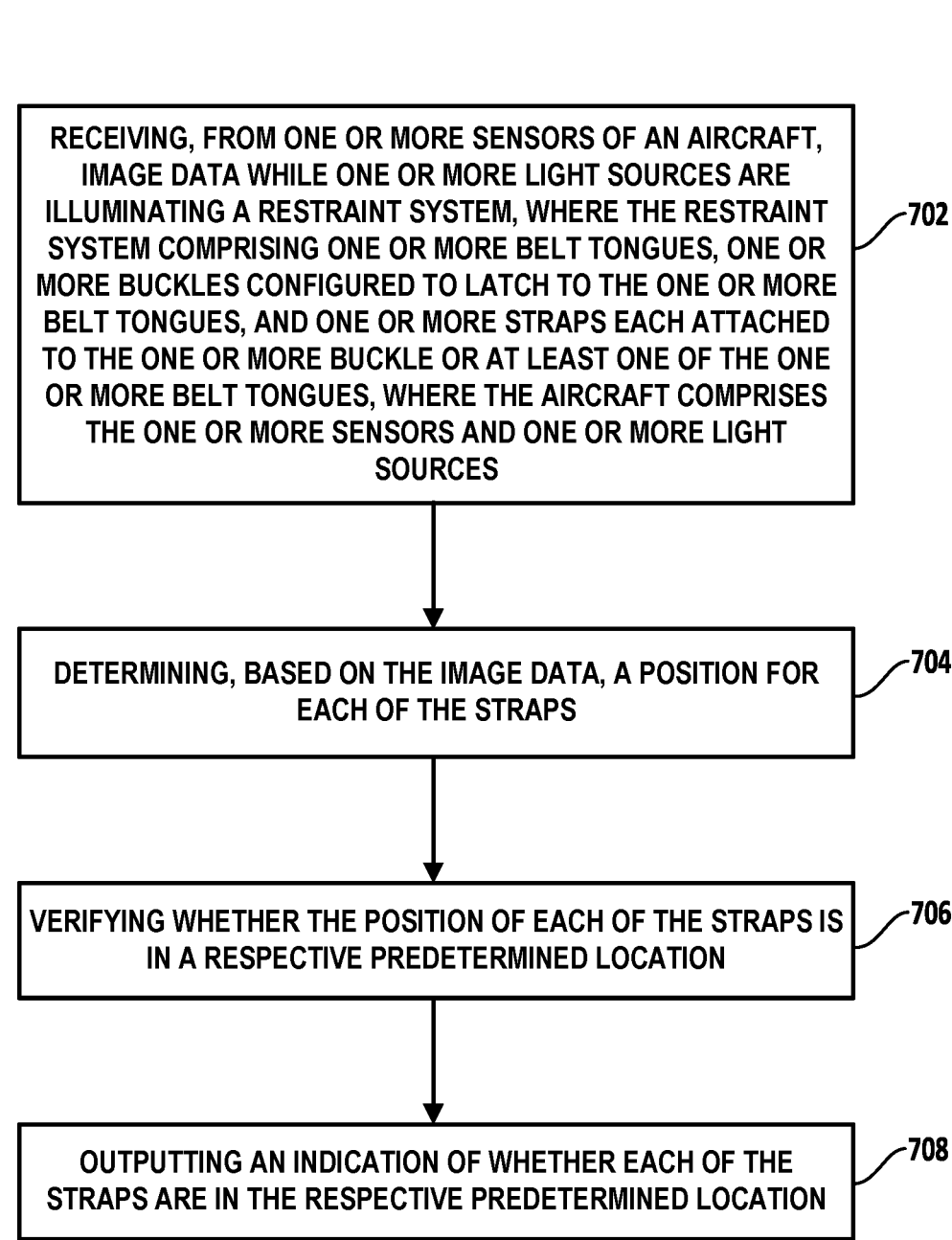

700

RECEIVING, FROM ONE OR MORE SENSORS OF AN AIRCRAFT, IMAGE DATA WHILE ONE OR MORE LIGHT SOURCES ARE ILLUMINATING A RESTRAINT SYSTEM, WHERE THE RESTRAINT SYSTEM COMPRISING ONE OR MORE BELT TONGUES, ONE OR MORE BUCKLES CONFIGURED TO LATCH TO THE ONE OR MORE BELT TONGUES, AND ONE OR MORE STRAPS EACH ATTACHED TO THE ONE OR MORE BUCKLE OR AT LEAST ONE OF THE ONE OR MORE BELT TONGUES, WHERE THE AIRCRAFT COMPRISES THE ONE OR MORE SENSORS AND ONE OR MORE LIGHT SOURCES ——702

DETERMINING, BASED ON THE IMAGE DATA, A POSITION FOR EACH OF THE STRAPS ——704

VERIFYING WHETHER THE POSITION OF EACH OF THE STRAPS IS IN A RESPECTIVE PREDETERMINED LOCATION ——706

OUTPUTTING AN INDICATION OF WHETHER EACH OF THE STRAPS ARE IN THE RESPECTIVE PREDETERMINED LOCATION ——708

FIG. 7

VEHICLE RESTRAINT SYSTEMS

CROSS-REFERENCE TO RELATED APPLICATIONS

This application claims priority to U.S. Provisional Patent Application No. 63/441,500, filed on Jan. 27, 2023, which is incorporated herein by reference in its entirety.

BACKGROUND

Restraint systems in vehicles may help facilitate safe transportation of passengers. In some examples, restraint systems may include a buckle strap that deters the movement of the vehicle causing the passenger from shifting in an unintentional way. For example, if a vehicle rapidly decelerates, the restraint system may restrain the passenger such that the rapid deceleration of the vehicle does not cause the passenger to unintentionally exit the vehicle.

Accordingly, the present application seeks to provide a system to ensure that the restraint system is properly secured prior to and during movement of the vehicle.

SUMMARY

The present disclosure describes implementations that relate to a vehicle and a restraint system in a vehicle.

In the first example implementation, the present disclosure describes a restraint system. The restraint system comprises one or more belt tongues, one or more buckles configured to latch to the one or more belt tongues, one or more signal transmitters, and one or more buckle sensors each associated with a belt tongue of the one or more belt tongues and a buckle of the one or more buckles. Each buckle sensor detects whether a respective belt tongue of the one or more belt tongues is latched to the respective buckle. The restraint system additionally comprises one or more receivers. The one or more receivers are configured to transmit one or more signals to each of the one or more signal transmitters and, in response to transmitting the one or more signals, receive at least one signal from at least one of the one or more signal transmitters, the at least one signal indicating that at least one respective belt tongue is latched to the respective buckle.

In a second example implementation, the present disclosure describes a system. The system includes one or more belt tongues, one or more buckles configured to latch to the one or more belt tongues, one or more signal transmitters, and one or more buckle sensors each associated with a belt tongue of the one or more belt tongues and a buckle of the one or more buckles. Each buckle sensor detects whether a respective belt tongue of the one or more belt tongues is latched to the respective buckle. The system additionally comprises one or more receivers. The one or more receivers are configured to transmit one or more signals to each of the one or more signal transmitters and, in response to transmitting the one or more signals, receive at least one signal from at least one of the one or more signal transmitters, the at least one signal indicating that at least one respective belt tongue is latched to the respective buckle.

In a third example implementation, the present disclosure describes a method. The method includes transmitting, by one or more receivers, one or more signals to each of one or more signal transmitters in a vehicle, where the vehicle comprises a restraint system and one or more receivers, where the restraint system comprises one or more belt tongues, the one or more signal transmitters, one or more buckle sensors each associated with a belt tongue of the one or more belt tongues and a buckle of the one or more buckles, where each buckle sensor detects whether a respective belt tongue of the one or more belt tongues is latched to the respective buckle, and one or more receivers. The method further includes, in response to transmitting the one or more signals, receive at least one signal from at least one of the one or more signal transmitters, the at least one signal indicating that at least one respective belt tongue is latched to the respective buckle.

In a fourth example implementation, the present disclosure describes a non-transitory computer-readable storage medium, having stored thereon program instructions that, upon execution by a processor, cause performance of a set of operations. The set of operations includes transmitting, by one or more receivers, one or more signals to each of one or more signal transmitters in a vehicle, where the vehicle comprises a restraint system and one or more receivers, where the restraint system comprises one or more belt tongues, the one or more signal transmitters, one or more buckle sensors each associated with a belt tongue of the one or more belt tongues and a buckle of the one or more buckles, where each buckle sensor detects whether a respective belt tongue of the one or more belt tongues is latched to the respective buckle, and one or more receivers. The set of operations further includes, in response to transmitting the one or more signals, receive at least one signal from at least one of the one or more signal transmitters, the at least one signal indicating that at least one respective belt tongue is latched to the respective buckle.

In a fifth example implementation, the present disclosure describes a vehicle comprising a restraint system comprising one or more belt tongues, one or more buckles configured to latch to the one or more belt tongues, and one or more straps each attached to at least one of the one or more buckles or at least one of the one or more belt tongues. The vehicle also comprises one or more sensors, one or more light sources, and a computing device. The computing device is configured to receive, from the one or more sensors, image data while the one or more light sources are illuminating the restraint system, determine, based on the image data, a position for each of the straps, verify whether the position of each of the straps is in a respective predetermined location, and output an indication of whether each of the straps are in the respective predetermined location.

In a sixth example implementation, the present disclosure describes a system. The system comprises a restraint system comprising one or more belt tongues, one or more buckles configured to latch to the one or more belt tongues, and one or more straps each attached to at least one of the one or more buckles or at least one of the one or more belt tongues. The system also comprises one or more sensors, one or more light sources, and a computing device. The computing device is configured to receive, from the one or more sensors, image data while the one or more light sources are illuminating the restraint system, determine, based on the image data, a position for each of the straps, verify whether the position of each of the straps is in a respective predetermined location, and output an indication of whether each of the straps are in the respective predetermined location.

In a seventh example implementation, the present disclosure describes a method comprising receiving, from one or more sensors of an aircraft, image data while one or more light sources are illuminating a restraint system, where the restraint system comprising one or more belt tongues, one or more buckles configured to latch to the one or more belt tongues, and one or more straps each attached to the one or more buckle or at least one of the one or more belt tongues, where the aircraft comprises the one or more sensors and one or more light sources. The method further comprises determining, based on the image data, a position for each of the straps, verifying whether the position of each of the straps is in a respective predetermined location, and outputting an indication of whether each of the straps are in the respective predetermined location.

In an eighth example implementation, the present disclosure describes a non-transitory computer-readable storage medium, having stored thereon program instructions that, upon execution by a processor, cause performance of a set of operations. The set of operations comprises receiving, from one or more sensors of an aircraft, image data while one or more light sources are illuminating a restraint system, where the restraint system comprising one or more belt tongues, one or more buckles configured to latch to the one or more belt tongues, and one or more straps each attached to the one or more buckle or at least one of the one or more belt tongues, where the aircraft comprises the one or more sensors and one or more light sources. The set of operations further comprises determining, based on the image data, a position for each of the straps, verifying whether the position of each of the straps is in a respective predetermined location, and outputting an indication of whether each of the straps are in the respective predetermined location.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

FIG. 6 is a flowchart illustrating an exemplary method of the present disclosure.

FIG. 7 is a flowchart illustrating an exemplary method of the present disclosure.

DETAILED DESCRIPTION

Vehicle restraint systems may help facilitate the safe transportation of passengers by restricting movement of passengers in critical situations. An example vehicle restraint systems may include one or more belt tongues and a buckle that may latch onto the one or more belt tongues. In some situations, it may be helpful for the vehicle to be able determine whether the restraint systems are properly secured, such that the vehicle restraint system can safely restrict movement of passengers if unforeseen situations occur. For a vehicle restraint system to be properly secured, the various components in the vehicle restraint system may be properly connected and placed in the intended position. For example, in the example vehicle restraint system, each of the belt tongues may be determined to be securely latched to the buckle, and the strap located across the lap of the passenger.

Disclosed herein are systems to facilitate detecting whether a vehicle restraint system is properly secured both before and during movement of the vehicle. An example vehicle restraint system may have one or more belt tongues and a buckle that may latch onto the one or more belt tongues. In some examples, the vehicle restraint system may also include one or more radio-frequency (RFID) tags connected to one or more buckle sensors. Each of the buckle sensors may be associated with a belt tongue and detect when the respective belt tongue is latched to the buckle. The vehicle may contain one or more receivers, which may send a signal to the RFID tags to determine whether each belt tongue is properly secured to the belt buckle.

Additionally and/or alternatively, the vehicle may use light sources and/or sensors to detect whether straps are properly located. For example, a computing device within the vehicle may be configured to receive data collected by the sensors and determine, based on the data, a position for each of the straps. In some examples, the straps may include reflective materials, which may reflect the light from the light sources to the sensors, which may facilitate determining a position for each of the straps. The computing device may then verify whether the position of the straps is in a respective predetermined location.

In the description provided below, a vehicle, such as a vertical take-off and landing (VTOL) vehicle/aircraft is used as an example application in which the disclosed systems and electric motor can be used and may offer several advantages such as compactness, light weight, enhanced power density, and higher efficiency. However, it should be understood that the disclosed assemblies can be used in any other machinery or vehicles (e.g., tractors, electric cars, stationary machinery in a manufacturing facility, etc.).

Figure 1:
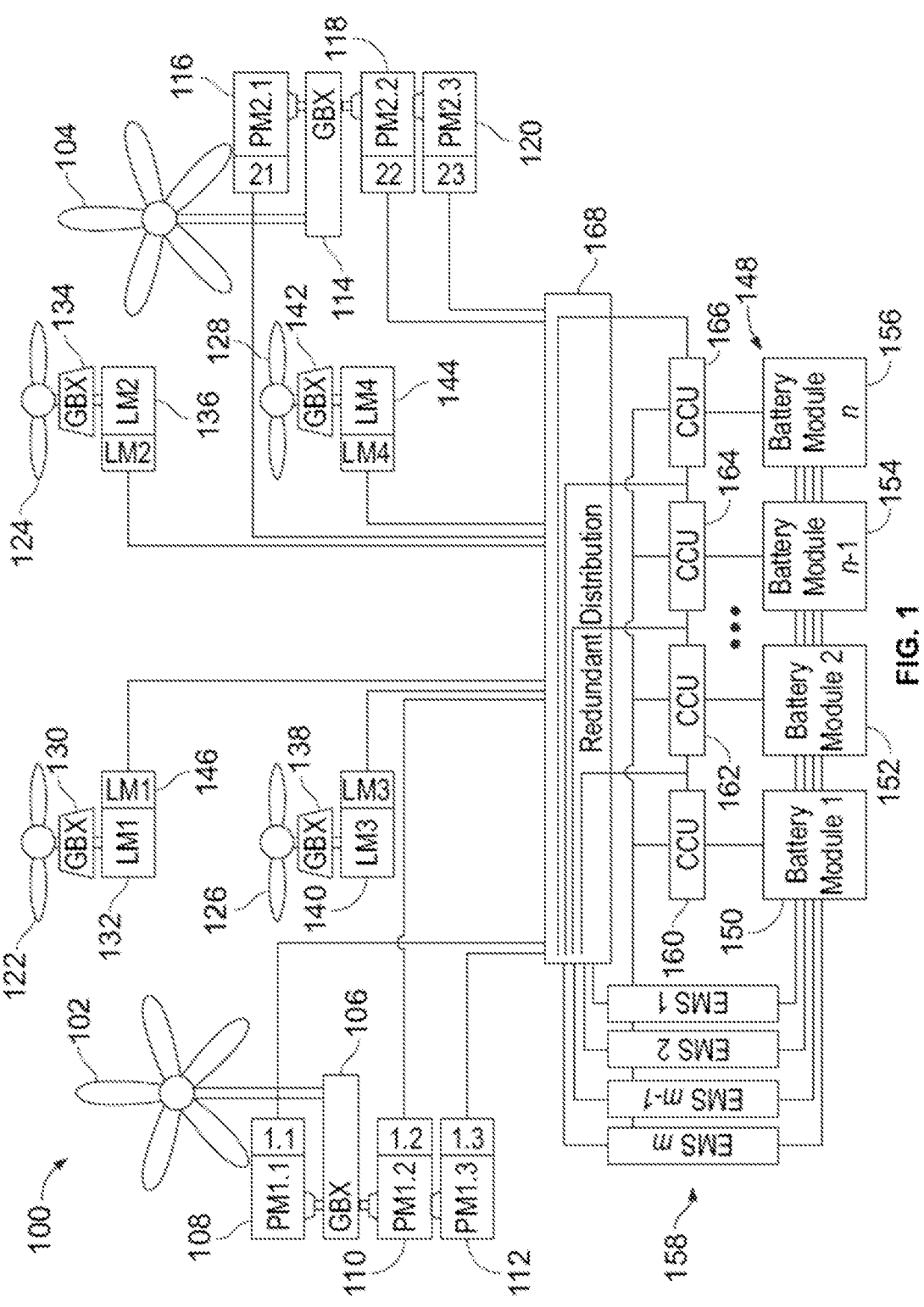
FIG. 1 illustrates a block diagram of a vehicle, according to exemplary embodiments of the present disclosure.

FIG. 1 is a block diagram of a vehicle 100, according to an exemplary embodiment of the present disclosure. In some embodiments, as noted above, the vehicle 100 can be VTOL, which may or may not use electric power to hover, takeoff, and/or land. It should be understood that in other embodiments, the vehicle 100 may be any other type of vehicle that may be able to utilize the advantages of the present invention, such as a ground vehicle (i.e., an automobile), a sea vehicle (such as a boat), or a flying craft (such as an aerial, floating, soaring, hovering, airborne, aeronautical aircraft, airplane, plane, spacecraft, a helicopter, an airship, or an unmanned aerial vehicle, or a drone).

In some embodiments, the vehicle 100 may include one or more propellers used to drive the vehicle, such as propellers 102, 104, 122, 124, 126, and 128 illustrated in FIG. 1. Each propeller may be configured, for examples, as tiltrotors, lift rotors, or any other type of rotors. In other embodiments, the vehicle 100 may include one or more turbine engines, one or more tires, one or more ski-structures, or the like instead of the one or more propellers used to drive the vehicle.

The first propeller 102 may be driven by a gearbox 106, which in turn may be driven by one or more electric motors such as propeller motor 108, propeller motor 110, and propeller motor 112. Similarly, the second propeller 104 may be driven by a gearbox 114, which in turn may be driven by one or more electric motors such as propeller motor 116, propeller motor 118, and propeller motor 120.

The vehicle 100 may also include multiple lift rotors that facilitate vertical take-off and landing of the vehicle 100. For example, the vehicle 100 can include a lift rotor 122, a lift rotor 124, a lift rotor 126, and a lift rotor 128.

The lift rotor 122 may be driven by a gearbox 130, which in turn may be driven by an electric motor 132. The lift rotor 124 may be driven by a gearbox 134, which in turn may be driven by an electric motor 136. The lift rotor 126 may be driven by a gearbox 138, which in turn may be driven by an electric motor 140. The lift rotor 128 may be driven by a gearbox 142, which in turn may be driven by an electric motor 144.

In one embodiment, each of the electric motors described above may include one or more respective motor controllers integrated therewith. For example, the lift motor 132 has one or more motor controllers 146 integrated therewith. Example motor controllers are described below.

The various electric motors of the vehicle 100 are driven by electric power provided by a plurality of batteries. As depicted in in FIG. 1, the vehicle 100 can have "n" battery modules 148, such as battery module 150, battery module 152, battery module 154, and battery module 156. In an example, the battery modules can be Lithium-ion (Li-Ion) batteries. Each battery module can include a housing or enclosure that houses a plurality of battery cells arranged in rows and columns.

The battery modules 148 may be configured to store electric power, and provide electric power to the various electric motors when commanded by respective energy management systems of the vehicle 100. Particularly, in an example implementation, the vehicle 100 can have a plurality of energy management systems (EMSs) 158 that are in communication with the battery modules 148. The EMSs 158 are configured as electronic regulators that monitor and control the charging and discharging of the battery modules 148.

In an example, the EMSs 158 may be configured to measure voltages of the battery modules 148 and stop charging them when a desired voltage is reached. Further, the EMSs 158 can be configured to monitor many factors that affect life and performance of the battery modules 148 as well as ensuring safe operation of the battery modules 148.

The EMSs 158 can monitor and control several factors or parameters of the battery modules 148. For example, the EMSs 158 monitor and control main power voltage, battery or cell voltage, charging and discharge rates of the battery modules 148, temperatures of the battery modules 148 or their individual cells, health of the battery modules 148 or their individual cells, coolant temperature and flow for air or liquid cooling parameters of a cooling system of the battery modules 148 or their individual cells, etc.

The vehicle 100 may further include multiple contactor control units (CCUs), such as CCU 160, CCU 162, CCU 164, and CCU 166, which are electrically coupled to the battery modules 148, and are in communication with the EMSs 158. In one embodiment, as illustrated in FIG. 1, each CCU is coupled to a respective battery module of the battery modules 148. A contactor is an electrically-controlled switch used for switching an electrical power circuit. A CCU controls the actuation of the contactor to allow power flow to and from the respective battery module. For example, the EMSs 158 may control the power flow to and from the battery modules 148 based on power demand from the various electric motors, and accordingly control the CCUs to enable power flow from particular battery modules as desired.

The vehicle 100 may be configured to include a distributed electric propulsion system configured to provide the vehicle 100 with the required energy to power the multiple propellers and lift rotors via an electric transmission system. Particularly, the vehicle 100 can include a redundant distribution module 168 in communication with the EMSs 158, and the redundant distribution module 168 is electrically coupled to the battery modules 148 via the respective CCUs, and is configured to provide electric power, via transmission lines, to the multiple electric motors of the vehicle 100.

The EMSs 158 along with the redundant distribution module 168 can provide for redundancy in the vehicle 100 such that if, for example, one propeller or one lift rotor fails, power can be distributed to other propellers/lift rotors to maintain safe operation of the vehicle 100.

Figure 2A:
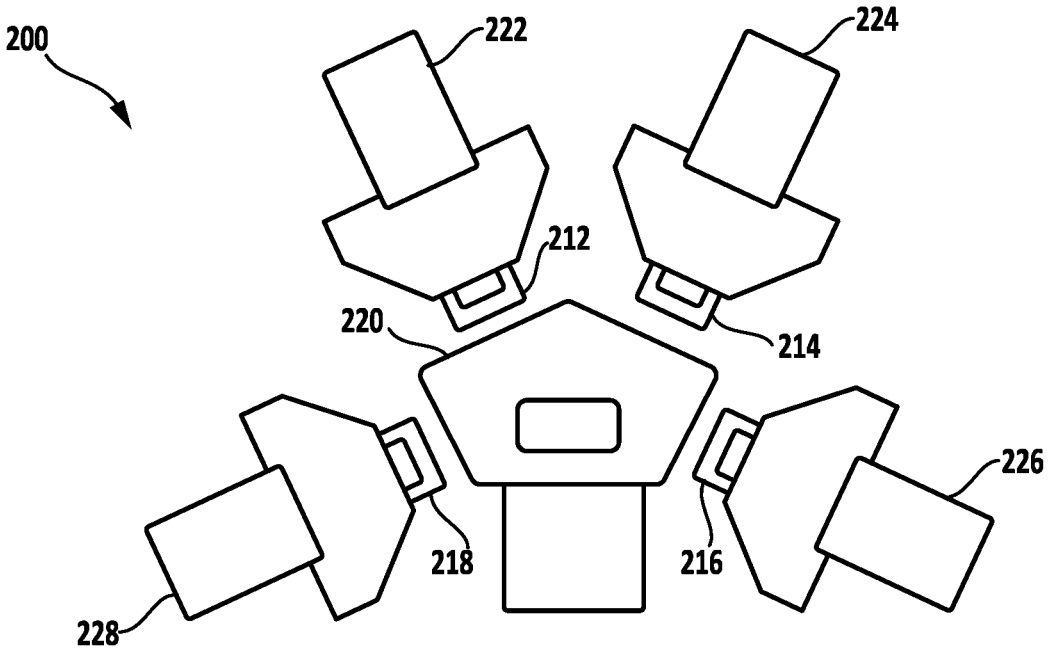
FIG. 2A is an example restraint system, according to exemplary embodiments of the present disclosure.

FIG. 2A is an example restraint system 200, in accordance with an exemplary embodiment. The restraint system 200 may be located in a vehicle, such as vehicle 100, a car, or an aircraft (e.g., a vertical takeoff and landing aircraft). The restraint system 200 includes a buckle 220, which may latch to each of a belt tongue 212, a belt tongue 214, a belt tongue 216, and a belt tongue 218. Each of the belt tongues may be connected to straps (222, 224, 226, 228), which may secure a passenger to the aircraft. For example, the belt tongue 212 may be connected to the strap 222 and the belt tongue 214 may be connected to the strap 224. Straps 222 and 224 may be positioned over the shoulders of a passenger to help secure the passenger to the seat. As shown, the belt tongue 216 may be connected to the strap 226 and the belt tongue 218 may be connected to the strap 228.

Figure 2B:
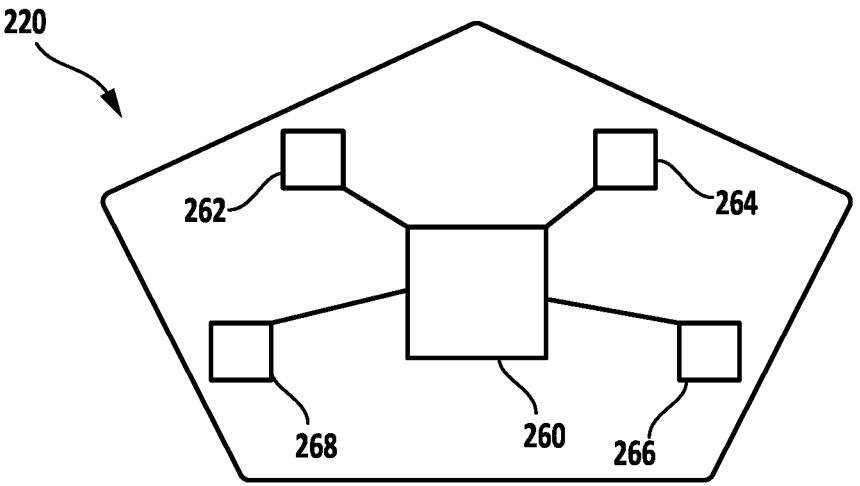
FIG. 2B is a block diagram of an example buckle, according to exemplary embodiments of the present disclosure.

In some examples, the buckle 220 may also include additional components to detect whether the belt tongues 212, 214, 216, and 218 are properly secured in the buckle 220. FIG. 2B is a block diagram of a belt buckle, in accordance with an example implementation.

The buckle 220 may include sensors 262, 264, 266, and 268. Each of the sensors 262, 264, 266, and 268 may be associated with a belt tongue and/or belt buckle, such that the sensor detects whether the respective belt tongue is secured in the belt buckle. For example, the sensor 262 may detect whether the belt tongue 212 is secured within the buckle 220, the sensor 264 may detect whether the belt tongue 214 is secured within the buckle 220, the sensor 266 may detect whether the belt tongue 216 is secured within the buckle 220, and the sensor 268 may detect whether the belt tongue 218 is secured within the buckle 220.

Various sensors and/or sensor arrangements may be used to detect whether the belt tongues are secured. In particular, the sensors 262, 264, 266, and 268 may each include switch sensors, other mechanical sensors, hall effect sensors, other magnetic sensors, etc. For example, when the belt tongue 212 is inserted into the buckle 220, the belt tongue 212 may push a switch sensor at the sensor 262, perhaps completing a circuit and causing a "HIGH" reading at the computing device.

In some embodiments, one or more RFIDs may be used to transmit the signal to a computing device in the vehicle 100. For example, each sensor of the sensors 262, 264, 266, and 268 may have an associated RFID tag, which may transmit a signal (such as in response to a request) to a computing device in the vehicle reporting whether the respective sensor detects that the respective belt tongue is secured to the buckle. Additionally and/or alternatively, the buckle may include one RFID tag (e.g., RFID tag 260) responsible for reporting whether each belt tongue is secured to the buckle as reported by the respective sensor.

Additional variations on reporting the sensor reading to a computing device on the aircraft may be possible. For example, the buckle 220 may include an analog circuit and/or computing device that aggregates the outputs of the sensors 262, 264, 266, and 268 into one reading of whether the passenger is prepared for takeoff. If one of the sensors indicates that the respective belt buckle is not secured, then the analog circuit and/or computing device may report that the passenger has not prepared for takeoff.

The RFID tags in the buckle 220 may be passive RFID tags and/or active RFID tags. Passive RFID tags may not need batteries or other energy sources to function, which may allow for a smaller system and less maintenance. In contrast, active RFID tags may be coupled with a battery or other energy source and may have the ability to transmit a stronger signal and/or to transmit a signal a longer distance away.

Further, in some examples, the vehicle may include one or more buckles. Each buckle may be configured to be connected to a belt tongue, such that the strap from the buckle and the strap from the belt tongue secures the passenger to the seat. Each buckle may have a sensor and an RFID tag, such that the sensor detects whether the belt tongue is attached to the buckle and the RFID tag can transmit a signal of the status of the belt tongue (e.g., whether the belt tongue is correctly inserted into the buckle).

As mentioned, the vehicle restraint system 200 may be located in a vehicle 100, such as a car or an aircraft (e.g., a vertical takeoff and landing aircraft). The vehicle 100 may contain receivers, which may transmit a signal to one or more RFID tags and receive a signal in response. For example, the receiver may send a signal to RFID tags associated with the sensors 262, 264, 266, and 268, and each of the RFID tags may respond with signals indicating whether the respective sensor is secured to the buckle. Because the restraint system 200 may be used to determine whether the vehicle can safely depart, the computing system may transmit the receivers may transmit the signals to each of the one or more RFID tags prior to departure (e.g., takeoff of an aircraft).

In some embodiments, each RFID tag may be associated with a different identifier, and the RFID tag may respond with the associated identifier. Additionally and/or alternatively, each sensor and/or buckle may be associated with a different identifier, and the RFID tag(s) may send the identifier associated with the sensor and/or buckle to the receiver.

A vehicle containing the vehicle restraint system 200 may include multiple restraint systems as well as multiple receivers. In some embodiments, each restraint system may be located at a seat of the vehicle, and the receivers may be located throughout the aircraft, such that the receivers may transmit requests to each of the RFID tags and may receive signals from each of the RFID tags in the vehicle. The receivers located throughout the aircraft may be integrated into existing aircraft systems, including, for example, the configuration above each seat including reading light and an adjustable air vent. The receivers may be connected to and/or include one or more computing systems, as will be described below.

Further, the receiver may be configured to verify whether the belt tongues are attached to the buckle and based on the verification that the belt tongues are attached to the buckle, the receiver may trigger one or more actions. These actions may include, for example, transmitting a signal requesting an indication of whether each of the straps are at a respective predetermined location.

Figure 3:
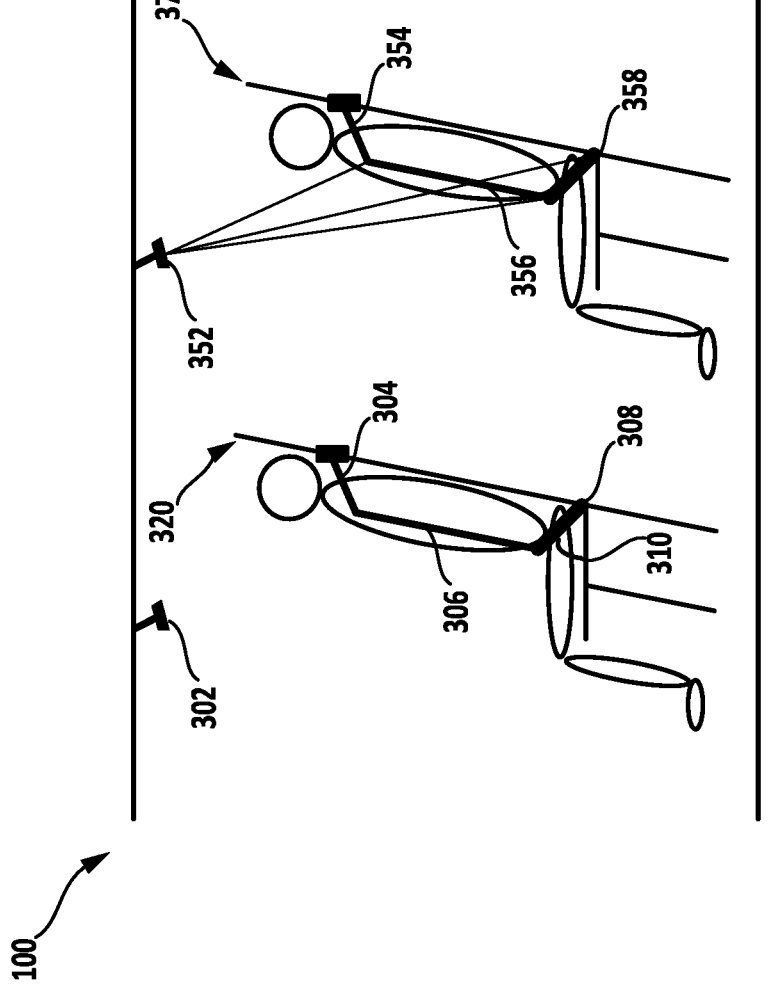
FIG. 3 is an example restraint system in an aircraft, according to exemplary embodiments of the present disclosure.

FIG. 3 is an example aircraft with restraint systems, in accordance with an example implementation. The restraint systems depicted in the vehicle 100 may be in conjunction with or as an alternative to the restraint system 200 of FIG. 200. The vehicle 100 may include the sensor arrangements 302 and 352, and each sensor system may be configured to monitor one or more seats. For example, the sensor arrangement 302 may be configured to monitor the seat 320 and the sensor arrangement 352 may be configured to monitor the seat 370. The seat 320 may include straps 304, 306, and 308. The seat 370 may include straps 354, 356, and 358. Each of the straps may be connected to buckles and/or buckle tongues, such as those depicted in FIG. 2 (e.g., buckle 220, belt tongue 212, a belt tongue 214, a belt tongue 216, and a belt tongue 218). As depicted, the sensor arrangements 302 and 352 may be separate from the restraint system of each seat. Further, the vehicle 100 may include one or more computing devices that perform various operations. For example, the sensor arrangements 302 and 352 may transmit the collected sensor data to the one or more computing devices for analysis. In some examples, the one or more computing devices may each be located at a sensor arrangement and analyze the sensor data collected by the respective sensor arrangement, before sending a signal to a main computing device indicating whether the computing device is ready for departure.

The sensor arrangements 302 and 352 may include infrared sensors and/or infrared light sources (not shown). The infrared light sources in the sensor arrangements 302 and/or 352 may output light that reflects off of the straps 304, 306, 308, 354, 356, and/or 358 and back to the infrared sensors, such that the sensors may capture an image of whether the straps are in the correct location. To facilitate this process, the straps 304, 306, 308, 354, 356, and/or 358 may each include one or more reflective sources that reflect infrared light and/or be made of material that reflects infrared light. Sensors, lights, and/or reflective sources of other wavelengths of light may also be used.

In some embodiments, the sensor arrangements 302 and 352 containing light sources and sensors may be part of a pre-existing user system. For example, the pre-existing user system may include a reading light and/or an adjustable air vent for each passenger. The sensor arrangements 302 and 352 may be configured to be part of this system, perhaps to facilitate easy installation and/or maintenance.

In some embodiments, to determine whether the restraint system is properly positioned, the computing device may determine the angle 310 between a seating surface of the seat 320 and the lower lap strap 308. If the angle 310 from the seating surface of the seat 320 and the lower lap strap 308 is within 35 degrees to 55 degrees, then the computing device may determine that the lap strap is properly positioned. For the restraint system to be correctly positioned, each of the components of the restraint system (e.g., buckle 220, belt tongue 212, a belt tongue 214, a belt tongue 216, and a belt tongue 218) may be connected, perhaps such that each belt tongue is attached to a buckle.

Additionally and/or alternatively, the sensor data may indicate various reflective sources on the straps, and the computing device may determine distances between the respective sources for a respective strap. The computing device may use the detected reflective samples also as a basis to calculate the angle for the respective strap. Based on the distance being within a predetermined distance range for the respective strap and the angle being within a predetermined angle range for the predetermined strap, the computing device may output an indication that the respective strap is correctly positioned.

The computing device may output various signals to determine whether the restraint system is correctly positioned. In some examples, the sensor arrangements 302 and 352 may include various light sources, and the computing device may output a corresponding signal using the light sources. For example, if the computing device determines that the restraint system of seat 320 is properly positioned and the computing device determines that the restraint system of seat 370 is improperly positioned, then the computing device may send a signal to the sensor arrangement 302 to output a red light and to the sensor arrangement 352 to output a green light.

In some embodiments, one or more cameras (not shown) may be positioned in the vehicle 100 to provide visual feedback to the computing device regarding the position of the straps on a passenger.

In some embodiments, the computing system may first determine whether the components of the restraint system are attached, perhaps through using the system and/or methods of FIG. 2.

Figure 4A:
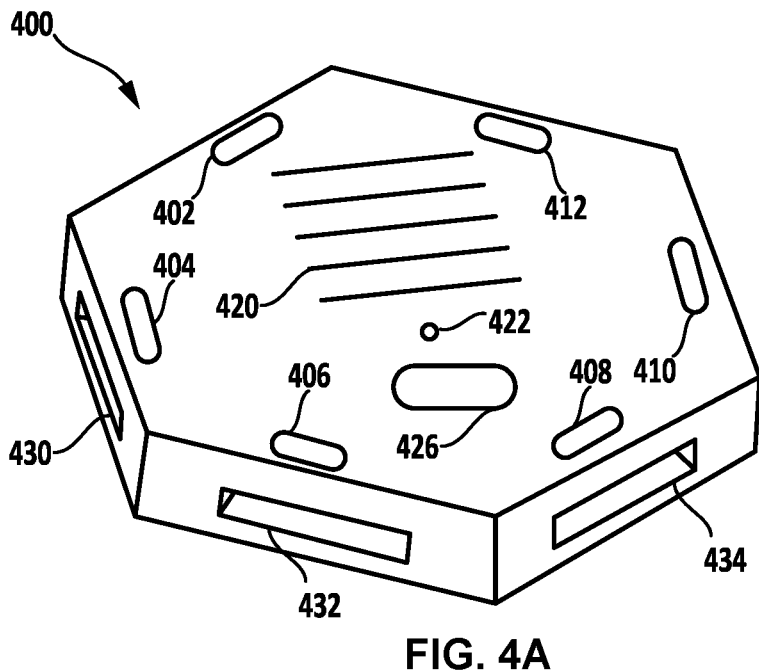
FIG. 4A depicts an example buckle, according to exemplary embodiments of the present disclosure.

FIG. 4A depicts an example buckle, according to exemplary embodiments of the present disclosure. As shown in FIG. 4A, buckle 400 may include one or more lights 402, 404, 406, 408, 410, and 412. In addition, buckle 400 may include buzzer/speaker 420, microphone 422, and button 426, which may be a call button. Further, buckle 400 may include one or more belt tongue inserts 430, 432, and 434. Buckle 400 may be used or otherwise combined in a restraint system mentioned above, such as in place of buckle 220 used in restraint system 200.

In some examples, buckle 400 may also include one or more other components, including Bluetooth Low Energy (BLE) circuitry, which may be contained inside the casing of buckle 400. The BLE circuitry inside buckle 400 and each of the other buckles in an aircraft may be used to monitor if belt tongues are fully inserted into belt tongue inserts, such as belt tongue inserts 430, 432, and 434. BLE circuitry may report the specific force, angular rate, and the orientation of buckle 400. As discussed later, buckle 400 may also include one or more sensors that may monitor or otherwise detect human presence, temperature, humidity, heart rates, among other examples.

Using lights 402, 404, 406, 408, 410, and 412, buzzer/speaker 420, microphone 422, and button 426, a computing system may communicate with a user and direct the user to fasten the restraint system or communicate other audio and/or visual information. In some examples, the computing system may be connected to the BLE circuitry or otherwise be incorporated into the BLE circuitry. The BLE circuitry may gather information as described above and communicate the information through lights 402, 404, 406, 408, 410, and 412, buzzer 420, speaker 422, and button 426.

In some examples, the aircraft may also include a Bluetooth transceiver to receive and/or provide signals from the BLE circuitry. For example, the Bluetooth transceiver may receive the status of each seat, including, for example, whether the buckle at each seat is properly fastened. If the Bluetooth transceiver receives an indication that the buckle at each seat is not properly fastened, the Bluetooth transceiver may send a signal to the BLE circuitry or other computing system of the unbuckled seat (e.g., buckle 400). In response, the BLE circuitry or other computing system may cause the lights 402, 404, 406, 408, 410, and 412, buzzer/speaker 420, microphone 422, and/or button 426 to perform one or more actions. In some examples, the Bluetooth transceiver may be located in the cabin of the aircraft and may receive signals from one or more buckles incorporating BLE circuitry.

Incorporating BLE circuitry into buckle 400 rather than other Bluetooth circuitry or other networking technology may help to conserve energy. In particular, buckle 400 may be of limited size, and incorporating low energy networking technology, such as BLE, may help facilitate reducing and/or optimizing the size of buckle 400. To power the networking circuitry, buckle 400 may incorporate one or more replaceable or rechargeable batteries. Using BLE circuitry may help reduce the power needed to power buckle 400, and thus also the battery used to power the BLE circuitry and the size of buckle 400. In some examples, the status of the battery may be indicated by lights 402, 404, 406, 408, 410, and/or 412. Incorporating BLE circuitry may also have other advantages, such as reducing the number of wirings to the seat by allowing for a battery to be incorporated into buckle 400 rather than for the networking technology circuitry to be wired to a power source outside of buckle 400. In addition, by allowing for a battery to be incorporated into buckle 400, seat installation may be simpler and more economical. Further, maintenance of and investigating issues with the seats may be easier, as the status of the battery may be indicated by one or more of lights 402, 404, 406, 408, 410, and 412.

Figure 4B:
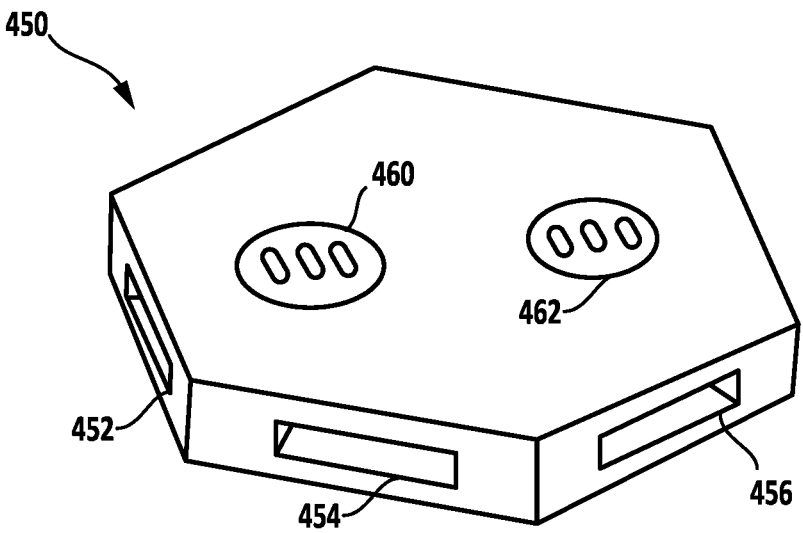
FIG. 4B depicts an example buckle, according to exemplary embodiments of the present disclosure.

As mentioned above, buckle 400 may also have buzzer/speaker 420, microphone 422, and button 426. Buzzer/speaker 420 may be used to notify the users of any issues or concerns, perhaps through a sound notification or through human voice. In addition, the user may use microphone 422 to record or otherwise receive what the user is communicating, and button 426 to initiate communication or otherwise request communication with ground support or flight crews FIG. 4B depicts an example buckle, according to exemplary embodiments of the present disclosure. As shown in FIG. 4B, buckle 450 may include sensors 460 and 462. In addition, buckle 450 may include belt tongue inserts 452, 454, and 464. It should be understood that components of buckle 450 may be incorporated into buckle 400 and/or buckle 220. Sensors 460 and 462 may be or otherwise include an accelerometer, a gyroscope sensor, an initial measurement unit sensor, hall sensors or load switches to detect the status of each of belt tongue inserts 452, 454, and 464, among other sensors described above. In addition, buckle 450 may also include a temperature sensor, a humidity sensor, a heartrate monitor sensor, a human body detection sensor, among other sensors that may help monitor the health of passengers aboard the aircraft.

In particular one or more of the sensors in buckle 450 may monitor the health of the passenger wearing a restraint system associated with buckle 450. Sensors for monitoring the passenger's health, such as heartrate monitors, temperature monitors, among others, may help detect if a passenger is in need of aid. For example, if a computing system of buckle 450 receives a heartrate of slower or faster than a threshold normal range, the computing system may alert the passenger through the buzzer or speaker system of buckle 450.

Figure 5:
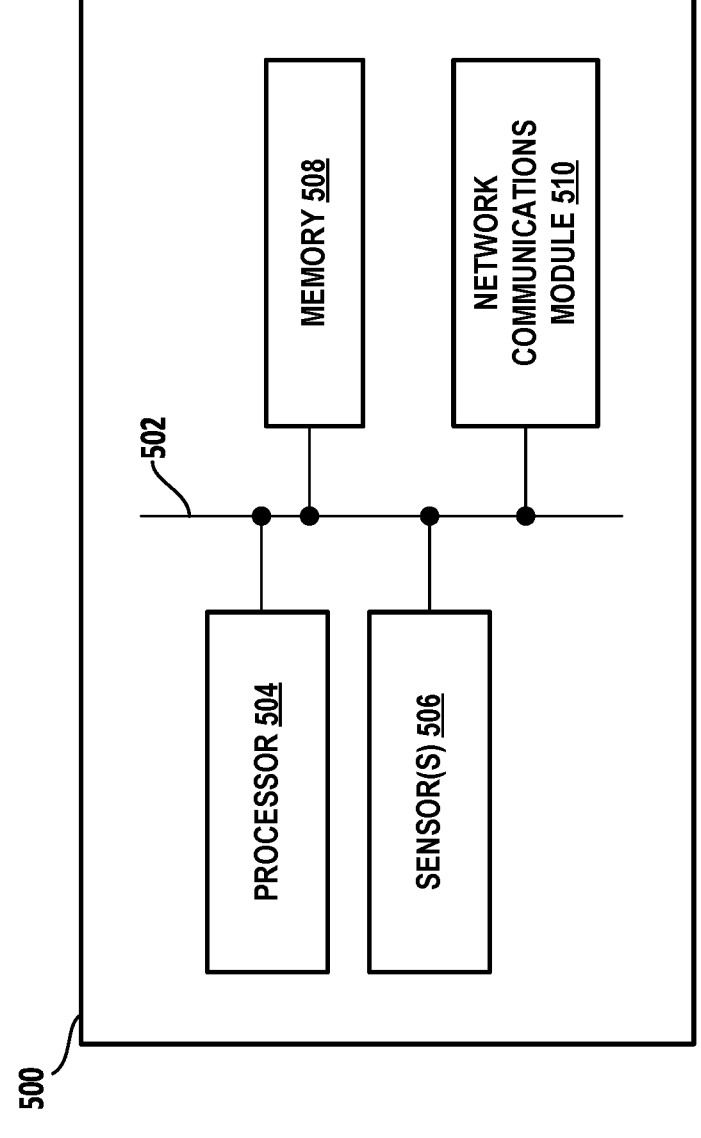
FIG. 5 is an illustration of a computing device, according to exemplary embodiments of the present disclosure.

FIG. 5 is an illustration of a computing device, according to exemplary embodiments of the present disclosure. The example computing device 400 illustrates some of the components that may be included in a computing device operating in a vehicle, such as an aircraft. The vehicle may include one or more computing devices, each having one or more components illustrated in the computing device 400.

The computing device 500 may include a processor 504, sensor(s) 506, memory 508, and a network communications module 510. The processor 504, the sensor(s) 506, the memory 508, and the network communications module 510 may be connected by system bus 502. The computing device 500 may also include additional components, which may also be connected by the system bus 502.

The processor 504 may include one or more processors, perhaps of different types. For example, the processor 504 may include a central processing unit (CPU), a co-processor (e.g., a graphics processing unit), a network processor, and/or a form of integrated circuit or controller that performs processor operations. Additionally and/or alternatively, the processor 504 may be one or more single-core processors and/or one or more multi-core processors with multiple independent processing units. In some examples, the processor 504 may include various memory units, including, for example, register memory and/or cache memory. Register memory may be used to store instructions being executed and related data and cache memory may be used to store recently-used instructions and data.

Sensor(s) 506 may include one or more sensors, perhaps of different types. For example, the sensor(s) 506 may include hall sensors and other magnetic sensors, switch sensors and other types of mechanical sensors, gyroscopes, accelerometers, cameras, infrared sensors, and LIDAR sensors, among other types of sensors. In some examples, the computing device 400 may receive data from sensor(s) 506 and store them in memory 510.

The memory 508 may include any type of computer-usable memory, including, for example, random access memory (RAM), read-only memory (ROM), and non-volatile memory. Non-volatile memory may include flash memory, hard disk drives, solid state drives, compact discs (CDs), digital video discs (DVDs), and/or tape storage, among other types of storage. The memory 510 may thus include temporary storage units and/or long-term storage units. The memory 508 may also include a flight data recorder, which may store flight information for the aircraft.

In addition, memory 508 may store program instructions and/or data on which program instructions may operate. In some examples, memory 508 may store program instructions on a non-transitory computer-readable medium, such that the instructions stored on the non-transitory computer-readable medium are executable by the processor 504 to carry out any of the methods, processes, or operations disclosed in this specification or the accompanying drawings.

The network communications module 510 may help facilitate wireless communications and/or wired communications. In some examples, wireless communications may include IEEE 802.11 (Wi-Fi), BLUETOOTH®, global positioning system (GPS), and a wide-area wireless interface, among others and wired communications may include Ethernet, Synchronous Optical Networking, and digital subscriber line, among others. The network communications module 510 may include one or more network communications modules and support one or more wireless and/or wired communications methods. For example, the network communications module 510 may include a module that supports Wi-Fi and a separate and/or integrated module that supports BLUETOOTH®.

FIG. 6 is a flowchart illustrating an example method for verifying whether the position of the straps are in a correct predetermined location. The example method 600 may be used in an aircraft (e.g., aircraft 100) and perhaps carried out by one or more computing devices, e.g., computing device 500.

The method 600 may include one or more operations, or actions as illustrated by one or more of steps 602-604. Although the steps are illustrated in a sequential order, these steps may in some instances be performed in parallel, and/or in a different order than those described herein. In addition, the various steps may be combined into fewer steps, divided into additional steps, and/or removed based upon the implementation.

Further, for the method 600 and other processes and operations disclosed herein, the flowchart may show a possible implementation of present examples. In this regard, each block may represent a module, a segment, or a portion of program code, which may include one or more instructions executable by a processor or controller (e.g., by the EMSs 158 and the CCUs 160-166) for implementing logical operations or steps in the process. The program code may be stored on any type of computer readable medium or memory (e.g., memory 408), for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 600 and other processes and operations disclosed herein, one or more steps in FIG. 6 may represent circuitry or digital logic that is arranged to perform the specific logical operations in the process.

At step 602, method 600 includes transmitting, by one or more receivers, one or more signals to each of one or more RFID tags in a vehicle, where the vehicle comprises a restraint system and one or more receivers, where the restraint system comprises one or more belt tongues, one or more buckles configured to latch to the one or more belt tongues, one or more radio-frequency identification (RFID) tags, and one or more belt buckle sensors, where each belt buckle sensor is associated with a belt tongue of the one or more belt tongues and a buckle of the one or more buckles, where each buckle sensor detects whether a respective belt tongue of the one or more belt tongues is latched to the respective buckle.

At step 604, method 600 includes in response to transmitting the one or more signals, receiving, by the one or more receivers, at least one signal from at least one of the one or more RFID tags, the at least one signal indicating that at least one respective belt tongue is latched to the respective buckle.

In some embodiments, the RFID tags passively transmit a signal to the one or more receivers.

In some embodiments, the RFID tags actively transmit a signal to the one or more receivers.

In some embodiments, the one or more RFID tags and the one or more buckle sensors are attached to a buckle of the one or more buckles.

In some embodiments, the one or more buckle sensors includes one or more hall sensors or one or more switch sensors.

In some embodiments, each buckle sensor of the one or more buckle sensors is associated with a RFID tag of the one or more RFID tags.

In some examples, each belt tongue is associated with a respective unique identifier, where the one or more signals comprises the respective unique identifier for each belt tongue detected to be latched to the respective buckle.

In some embodiments, the restraint system are positioned within an aircraft.

In some embodiments, the one or more receivers are separate from the restraint system.

In some embodiments, transmitting the one or more signals to each of the one or more RFID tags occurs prior to takeoff of the vehicle.

In some embodiments, the one or more receivers are further configured to verify, based on the signals, whether the belt tongues are attached to the respective buckle, and based on the verifying, transmit a signal to a computing system indicating whether a vehicle in which the restraint system is positioned is ready for takeoff.

In some embodiments, the restraint system further comprises one or more straps each attached to at least one of the buckles or at least one of the one or more belt tongues, where the one or more receivers are further configured to verify, based on the signals, whether the belt tongues are attached to the respective buckle, and based on the verifying, transmit a signal requesting an indication of whether each of the straps are at a respective predetermined location.

In some embodiments, the one or more buckles is a buckle configured to latch to the one or more belt tongues.

In some embodiments, method 600 may be carried out by one or more receivers of a restraint system including one or more belt tongues, one or more buckles configured to latch to the one or more belt tongues, one or more radio-frequency identification (RFID) tags, one or more receivers, and one or more buckle sensors each associated with a belt tongue of the one or more belt tongues and a buckle of the one or more buckles, where each buckle sensor detects whether a respective belt tongue of the one or more belt tongues is latched to the respective buckle.

FIG. 7 is a flowchart illustrating an example method for verifying whether one or more belt tongues are properly latched to the buckle. Although the steps are illustrated in a sequential order, these steps may in some instances be performed in parallel, and/or in a different order than those described herein. In addition, the various steps may be combined into fewer steps, divided into additional steps, and/or removed based upon the implementation.

The method 700 may include one or more operations, or actions as illustrated by one or more of steps 702-708. Although the steps are illustrated in a sequential order, these steps may in some instances be performed in parallel, and/or in a different order than those described herein. In addition, the various steps may be combined into fewer steps, divided into additional steps, and/or removed based upon the implementation.

Further, for the method 700 and other processes and operations disclosed herein, the flowchart may show a possible implementation of present examples. In this regard, each block may represent a module, a segment, or a portion of program code, which may include one or more instructions executable by a processor or controller (e.g., by the EMSs 158 and the CCUs 160-166) for implementing logical operations or steps in the process. The program code may be stored on any type of computer readable medium or memory (e.g., memory 508), for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 700 and other processes and operations disclosed herein, one or more steps in FIG. 7 may represent circuitry or digital logic that is arranged to perform the specific logical operations in the process.

At step 702, the method 700 includes receiving, from one or more sensors of an aircraft, image data while one or more light sources are illuminating a restraint system, where the restraint system comprising one or more belt tongues, one or more buckles configured to latch to the one or more belt tongues, and one or more straps each attached to the one or more buckle or at least one of the one or more belt tongues, where the aircraft comprises the one or more sensors and one or more light sources.

At step 704, the method 700 includes determining, based on the image data, a position for each of the straps.

At step 706, the method 700 includes verifying whether the position of each of the straps is in a respective predetermined location.

At step 708, the method 700 includes outputting an indication of whether each of the straps are in the respective predetermined location.

In some embodiments, outputting the indication of whether each of the straps are in the respective predetermined location comprises transmitting a notification of whether each of the straps are in the respective predetermined location.

In some embodiments, the restraint system further comprises one or more radio-frequency (RFID) tags and one or more buckle sensors, where the vehicle further comprises one or more receivers configured to transmit one or more signals to each of the one or more RFID tags, and, in response to transmitting the one or more signals, receive at least one signal from at least one of the one or more RFID tags, the at least one signal indicating that at least one belt tongue is latched to at least one buckle.

In some embodiments, the vehicle further comprises one or more walls, where the one or more light sources and the one or more sensors are mounted to the walls and separate from the restraint system.

In some embodiments, the one or more light sources are infrared light sources, where the one or more sensors are infrared detectors.

In some embodiments, the restraint system further comprises a seating surface, where the one or more straps comprises a lower lap strap connected to a belt tongue of the one or more belt tongues, where the respective predetermined location for the lower lap strap is within 35 degrees to 55 degrees to the seating surface.

In some embodiments, each strap of the one or more straps comprises a plurality of reflective sources, where verifying whether the position of each of the one or more straps are in the respective predetermined location comprises, for each respective strap, determining a distance between the plurality of reflective sources for the respective strap, calculating an angle for the respective strap, and determining whether the distance between the plurality of respective sources is within a predetermined distance range for the respective strap and the angle is within a predetermined angle range for the respective strap.

In some embodiments, the vehicle comprises one or more seats, where the restraint system is associated with a seat of the one or more seats, where each sensor of the one or more sensors and each light source of the one or more light sources is associated with a seat of the one or more seats.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

The invention claimed is:

1. A restraint system comprising:
one or more belt tongues,
one or more buckles configured to latch to the one or more belt tongues,
one or more straps each attached to at least one of the one or more belt tongues or at least one of the one or more buckles, wherein each strap of the one or more straps comprises one or more reflective sources,
one or more signal transmitters,
one or more buckle sensors each associated with a belt tongue of the one or more belt tongues and a buckle of the one or more buckles, wherein each buckle sensor detects whether a respective belt tongue of the one or more belt tongues is latched to the respective buckle;
one or more receivers, wherein the one or more receivers are configured to:
transmit one or more signals to each of the one or more signal transmitters; and
in response to transmitting the one or more signals, receive at least one signal from at least one of the one or more signal transmitters, the at least one signal indicating that at least one respective belt tongue is latched to the respective buckle;
one or more light sources configured to illuminate the restraint system;
one or more strap sensors configured to capture image data while the one or more light sources are illuminating the restraint system; and
a computing device configured to:
receive, from the one or more sensors, image data while the one or more light sources are illuminating the restraint system;
determine, based on the image data, a position for each of the straps;
verify whether the position of each of the straps is in a respective predetermined location based on a position of a respective reflective source of the one or more reflective sources, wherein verifying whether the position of each of the one or more straps are in the respective predetermined location based on the position of the respective reflective source of the one or more reflective sources comprises, for each respective strap:
determining a distance between the one or more reflective sources for the respective strap,
calculating an angle for the respective strap, and
determining whether the distance between the one or more reflective sources is within a predetermined distance range for the respective strap and the angle is within a predetermined angle range for the respective strap; and
output an indication of whether each of the straps are in the respective predetermined location.

2. The restraint system of claim 1, the signal transmitters comprise at least one of radio frequency identification (RFID) tags or Bluetooth Low Energy (BLE) circuitry.

3. The restraint system of claim 1, wherein the one or more signal transmitters and the one or more buckle sensors are attached to a buckle of the one or more buckles.

4. The restraint system of claim 3, wherein the one or more buckle sensors comprises one or more hall sensors or one or more switch sensors.

5. The restraint system of claim 1, wherein the each buckle sensor of the one or more buckle sensors is associated with a signal transmitter of the one or more signal transmitters.

6. The restraint system of claim 1, wherein each belt tongue is associated with a respective unique identifier, wherein the one or more signals comprises the respective unique identifier for each belt tongue detected to be latched to the respective buckle.

7. The restraint system of claim 1, wherein the restraint system is positioned within an aircraft.

8. The restraint system of claim 1, the one or more receivers are separate from the restraint system.

9. The restraint system of claim 1, wherein transmitting the one or more signals to each of the one or more signal transmitters occurs prior to takeoff of a vehicle comprising the restraint system.

10. The restraint system of claim 1, wherein the one or more receivers are further configured to:

verify, based on the signals, whether the belt tongues are attached to the respective buckle; and based on the verifying, transmit a signal to a computing system indicating whether a vehicle in which the restraint system is positioned is ready for takeoff.

11. The restraint system of claim 1, wherein the restraint system further comprises one or more straps each attached to at least one of the buckles or at least one of the one or more belt tongues, wherein the one or more receivers are further configured to:

verify, based on the signals, whether the belt tongues are attached to the respective buckle; and based on the verifying, transmit a signal requesting an indication of whether each of the straps are at a respective predetermined location.

12. A vehicle comprising:

a restraint system comprising one or more belt tongues, one or more buckles configured to latch to the one or more belt tongues, and one or more straps each attached to at least one of the one or more buckles or at least one of the one or more belt tongues, wherein each strap of the one or more straps comprises one or more reflective sources;

one or more sensors;

one or more light sources; and a computing device configured to:

receive, from the one or more sensors, image data while the one or more light sources are illuminating the restraint system;

determine, based on the image data, a position for each of the straps;

verify whether the position of each of the straps is in a respective predetermined location based on a position of a respective reflective source of the one or more reflective sources, wherein verifying whether the position of each of the one or more straps are in the respective predetermined location based on the position of the respective reflective source of the one or more reflective sources comprises, for each respective strap:

determining a distance between the one or more reflective sources for the respective strap, calculating an angle for the respective strap, and determining whether the distance between the one or more reflective sources is within a predetermined distance range for the respective strap and the angle is within a predetermined angle range for the respective strap; and output an indication of whether each of the straps are in the respective predetermined location.

13. The vehicle of claim 12, wherein the restraint system further comprises one or more signal transmitters and one or more buckle sensors, wherein the vehicle further comprises one or more receivers configured to:

transmit one or more signals to each of the one or more signal transmitters; and in response to transmitting the one or more signals, receive at least one signal from at least one of the one or more signal transmitters, the at least one signal indicating that at least one belt tongue is latched to at least one buckle.

14. The vehicle of claim 12, wherein the vehicle further comprises one or more walls, wherein the one or more light sources and the one or more sensors are mounted to the walls and separate from the restraint system.

15. The vehicle of claim 12, wherein the one or more light sources are infrared light sources, wherein the one or more sensors are infrared detectors.

16. The vehicle of claim 12, wherein the restraint system further comprises a seating surface, wherein the one or more straps comprises a lower lap strap connected to a belt tongue of the one or more belt tongues, wherein the respective predetermined location for the lower lap strap is within 35 degrees to 55 degrees to the seating surface.

17. The vehicle of claim 15, wherein the vehicle comprises one or more seats, wherein the restraint system is associated with a seat of the one or more seats, wherein each sensor of the one or more sensors and each light source of the one or more light sources is associated with a seat of the one or more seats.

18. A method comprising:

receiving, from one or more sensors of an aircraft, image data while one or more light sources are illuminating a restraint system, wherein the restraint system comprising one or more belt tongues, one or more buckles configured to latch to the one or more belt tongues, and one or more straps each attached to the one or more buckle or at least one of the one or more belt tongues, wherein each strap of the one or more straps comprises one or more reflective sources, and wherein the aircraft comprises the one or more sensors and one or more light sources;

determining, based on the image data, a position for each of the straps;

verifying whether the position of each of the straps is in a respective predetermined location based on the position of a respective reflective source of the one or more reflective sources, wherein verifying whether the position of each of the one or more straps are in the respective predetermined location based on the position of the respective reflective source of the one or more reflective sources comprises, for each respective strap:

determining a distance between the one or more reflective sources for the respective strap, calculating an angle for the respective strap, and determining whether the distance between the one or more reflective sources is within a predetermined distance range for the respective strap and the angle is within a predetermined angle range for the respective strap; and outputting an indication of whether each of the straps are in the respective predetermined location.

19. The method of claim 18, wherein outputting the indication of whether each of the straps are in the respective predetermined location comprises transmitting a notification of whether each of the straps are in the respective predetermined location.

\*  \*  \*  \*  \*